United States Patent [19]

Hostein

[11] 4,034,346
[45] July 5, 1977

[54] INTERFACE FOR ESTABLISHING COMMUNICATIONS BETWEEN A DATA-PROCESSING UNIT AND A PLURALITY OF STATIONS

[75] Inventor: Claude Hostein, Avrille, France

[73] Assignee: Compagnie Honeywell Bull (Societe Anonyme), Paris, France

[22] Filed: Oct. 15, 1975

[21] Appl. No.: 622,466

[52] U.S. Cl. .............................................. 364/900
[51] Int. Cl.² .......................................... G06F 3/00
[58] Field of Search .................................. 340/172.5

[56] References Cited

UNITED STATES PATENTS

| 3,454,936 | 7/1969 | Bridge et al. | 340/172.5 |
| 3,543,240 | 11/1970 | Miller et al. | 340/172.5 |
| 3,863,226 | 1/1975 | Ryburn | 340/172.5 |

Primary Examiner—Raulfe B. Zache
Attorney, Agent, or Firm—Lowe, King, Price & Markva

[57] ABSTRACT

An interface connects a data-processing unit to a group of m working stations, each including items of data emitting and receiving apparatus. The unit and each of the items of apparatus transmit and receive binary data in parallel characters in response to control signals generated by the unit. The characters are coupled between the interface and stations as serial bits via a separate channel that extends to each station. Each channel includes separate lines for sending the characters in opposite directions. At the interface, there are provided m transmitter/receiver circuits, one of which is associated with each of the m stations. There is a transmitter/receiver circuit associated with each item of apparatus at each of the stations. Each transmitter/receiver circuit includes a parallel to serial converter for each parallel input character supplied to it and a serial to parallel converter for each series character applied to it. Parallel output characters from the unit are selectively applied as parallel input characters to each of the station transmitter/receiver circuits. Parallel output characters of each apparatus transmitter/receiver circuit associated with a particular item of apparatus are applied as parallel input characters to the item of apparatus associated with the apparatus transmitter/receiver circuit.

19 Claims, 7 Drawing Figures

INTERFACE FOR ESTABLISHING COMMUNICATIONS BETWEEN A DATA-PROCESSING UNIT AND A PLURALITY OF STATIONS

FIELD OF THE INVENTION

The present invention relates to an interface for connecting a data-processing unit to a group of $m$ working stations including items of data emitting and receiving apparatus.

BACKGROUND OF THE INVENTION AND OBJECTS OF THE INVENTION

Exchanges of data between a data-processing unit and working stations generally take place via cable connections. In a known method of connection, termed star connection, each of the items of apparatus at a working station is connected to the unit by a cable associated with it. Such a connection does away with the necessity for an addressing circuit to be fitted to each item of apparatus and, by the use of standardized plugs and sockets, allows the user to make up the working station to suit his needs. However, star connections make it necessary for any given working station to have as many cables as there are items of apparatus at the station and require wiring done at the time of installation to be such as to indicate to the data-processing unit which socket corresponds to which item of apparatus. Also, since the input/output management capabilities of the data-processing unit are limited, the number of items of apparatus which can be connected must remain limited if the design of the unit is not to become excessively complicated.

The exchange of data between a processing unit and an apparatus is the responsibility of a pair of data transmitting and receiving circuits which are situated at respective ends of the cable connecting the apparatus to the unit. If the number of items of apparatus is high, the number of transmitter/receiver circuits is correspondingly greater. Because the plugs and sockets are standardized at the end of the cable connected to the unit, it is necessary when a working station is brought into operation to indicate to the unit the type of apparatus which is connected to the concerned plug. Type should be understood to cover not only the general type of peripheral at the apparatus (keyboard, display screen, ETC.) but also sub-types within a given type; for example whether a keyboard is digital or alphanumeric. Each item of apparatus must therefore include a circuit to allow it to recognize a type query from the unit and to reply by transmitting to the unit an indication of its type. While star connections theoretically allow the unit to operate simultaneously with the various different items of apparatus connected to it, this possibility is not usually available because of the sequential nature of addressing software which the unit employs to establish a communication link with the items of apparatus at one and the same working station.

One of the objects of the present invention is to provide an interface for connecting a data-processing unit to a plurality of working stations, which interface has a small number of data transmission channels and transmitter/receiver circuits, thus reducing its manufacturing costs in comparison with known interfaces.

Another object of the invention is to provide apparatus that can be removed from or added to a working station without the necessity of increasing or removing circuits at the inputs and outputs of the unit at the time of installation.

Another object of the invention is to provide a new and improved interface between a data processing unit and a number of working stations, which interface allows a large number of items of apparatus to be provided at the same working station.

Another object of the invention is to provide a new and improved interface between a data processing unit and a number of working stations, wherein connections to a transmission means are more readily established than those used in the prior art, such as the star connection.

Another object of the invention is to provide reliable apparatus for exchanging data between a data-processing unit and items of apparatus at stations which are connected to the unit.

BRIEF DESCRIPTION OF THE INVENTION

According to the invention, there is provided an interface for connecting a data-processing unit to a group of $m$ working stations made up of items of data emitting and receiving apparatus. The unit and each of the items of apparatus are designed to transmit and receive binary data in parallel, character by character, as a result of control signals generated in the unit. The interface contains $m$ transmitter/receiver circuits, one of which is associated with each of the $m$ stations. At each of the stations, a separate transmitter/receiver circuit is associated with each item of apparatus. Each transmitter/receiver circuit is designed to convert a received, input parallel character having a predetermined number of simultaneously occurring bits, into a series character, the constituent bits of which are transmitted in succession by an output to a first transmission line of a channel for connecting a station transmitter/receiver circuit and the apparatus transmitter/receiver circuits at that station together. Each transmitter/receiver circuit also converts the bits forming an input series character, i.e., bits which are successively received by an input of the circuit from a second transmission line of a channel into a parallel character having a number of simultaneously occurring bits corresponding to the number of serial bits in a series character fed to the circuit. The data processing unit supplies parallel characters to the parallel inputs and is responsive to the parallel character outputs of the transmitter/receiver circuits associated with the $m$ stations. Each item of apparatus supplies parallel characters to the parallel inputs and is responsive to the parallel characters outputs of the transmitter/receiver circuit associated with it.

The above and still further object, features and advantages of the present invention will become apparent upon consideration of the following detailed description of one specific embodiment thereof, especially when taken in conjunction with the accompanying drawing.

DETAILED DESCRIPTION OF THE DRAWING

Figure 1:
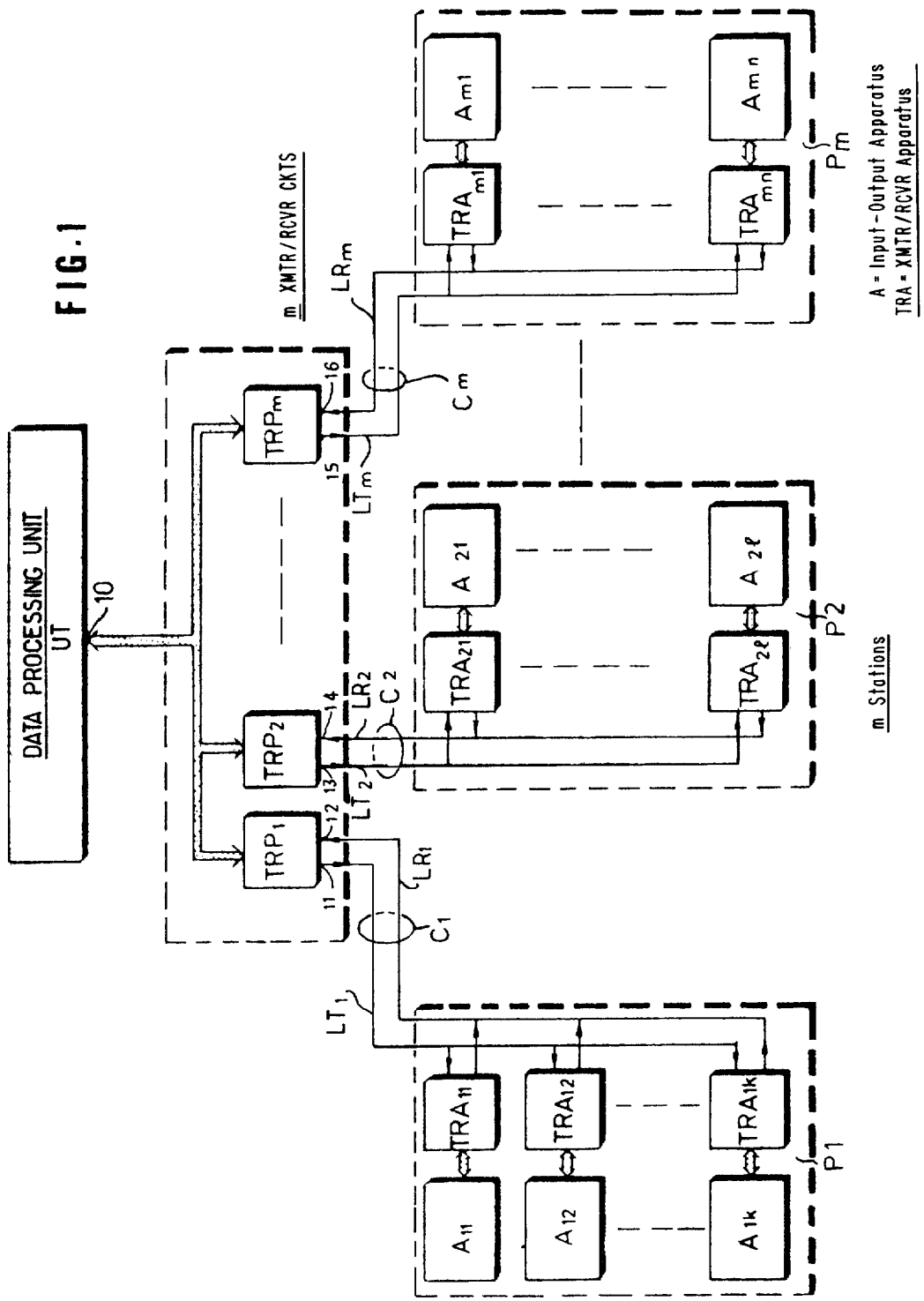
FIG. 1 is a general diagram of a system wherein a data processing unit is connected to a plurality of stations by a connecting interface according to the invention.

In FIG. 1, a group 10 of inputs and outputs of a data-processing unit UT, is connected in parallel to $m$ transmitter/receiver circuits (TRP1, TRP2 . . . TRP$m$) of the connecting interface according to the invention. Data are transmitted between unit UT and each of the $m$ transmitter/receiver circuits TRP as multi bit parallel characters, which are sequentially derived at a rate controlled by a clock in the unit.

A serial output signal terminal 11 and a serial input signal terminal 12 of circuit TRP1 are respectively connected to lines LT1 and LR1 which form a channel C1, to $k$ transmitter/receiver circuits (TRA11, TRA12 . . . TRA1K) associated with the $k$ items of input-output apparatus (A11, A12 . . . A1$k$) at a first station P1; $m$ stations P are provided so that there is one interface circuit TRP for each station P. An output 13 and an input 14 of circuit TRP2 are connected in series, by respective ones of lines LT2 and LR2 which form a channel C2, to L transmitter/receiver circuits (TRA21, . . . TRA2L) associated with the items of apparatus (A21, . . . A2L) forming a second station P2. An output 15 and an input 16 of circuit TRP$m$ are connected in series, by lines LT$m$ and LR$m$ forming a channel C$m$, to $n$ transmitter/receiver circuits (TRA$m$1, . . . TRA$mn$) associated with the $n$ items of apparatus (A$m$1, . . . A$mn$)forming an $m^{th}$ station P$m$. Exemplary of the several apparatus items A at the $m$ stations P are card readers, key boards, CRT alpha numeric displays, and memories of mini-computers. Each item of information received by the inputs of circuit TRP1 from unit UT, which is to be communicated to apparatus A11 for example, is transmitted to apparatus A11 from output 11 of circuit TRP1, which is connected to circuit TRA11 by line LT1. Each item of information which apparatus A11 communicates to unit UT is transmitted by circuit TRA11, which is connected to input 12 of circuit TRP1 by line LR1. Once a communication link has been established between unit UT and station P1, for example by circuit TRP1 and lines LT1 and LR1, unit UT may communicate successively with the $k$ items of apparatus A at station P1 without addressing a different one of channels C.

Figure 2:
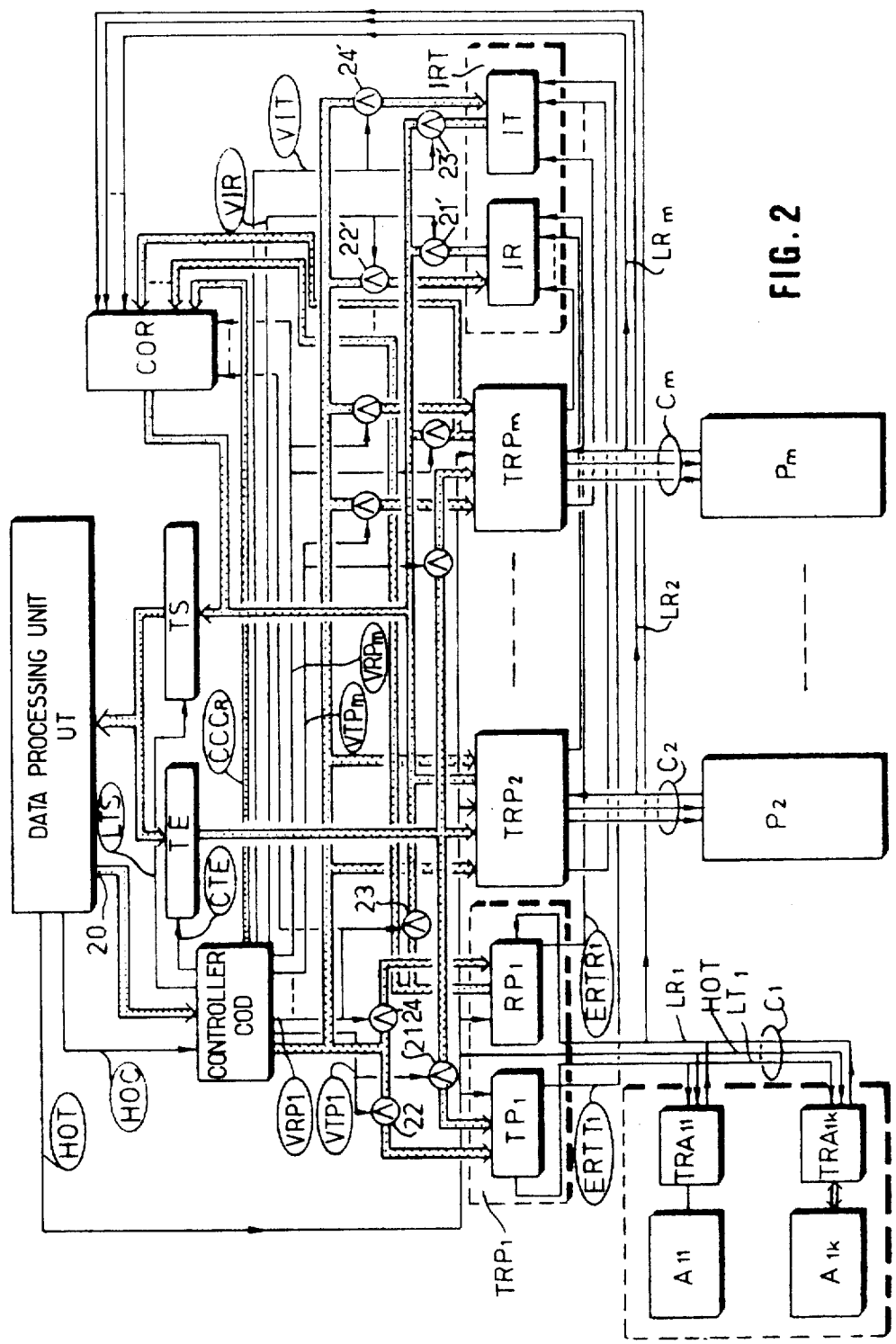
FIG. 2 is a diagram wherein there are illustrated greater details of the connecting interface shown in FIG. 1.

The interface for connecting unit UT to the group of $m$ stations (P1, P2 . . . P$m$) in FIG. 1 includes, as illustrated in FIG. 2, a control circuit COD which is connected to be responsive to control signal outputs 20 of unit UT; the control signals enable a communication link between unit UT and a selected apparatus at a selected station to be established via the interface. The control signal outputs 20 are fed to circuit COD from unit Ut in response to clock signals or pulses (H$o$C) which are generated by the unit once a character. Each time a clock pulse H$o$C is derived from unit UT, a control signal is supplied by unit UT to controller COD.

In response to the control signals from unit UT circuit COD selectively generates a CTE signal during the interval between adjacent H$o$C pulses; the CTE signal causes data to be fed from the unit UT to an input buffer circuit TE in the interface and thence to be transferred to one of the station transmitter circuits TP under the control of the further signal (VT) selectively derived from circuit COD under the control of outputs 20 of unit UT. The signal (VT) enables a selected AND gate to transfer the address data contained in circuit TE to the selected transmitter circuit TP; e.g.; if it is desired to establish a link from unit UT to station P$_1$, the unit supplies a signal to COD which generates a VTP$_1$ signal to enable AND gate 21 so as to transfer the data contained in circuit TE to transmitter circuit TP1. In response to unit UT signaling it is to be responsive to a signal from a selected one of stations P, a VR signal is derived from controller COD. The VR signal enables an AND gate connected to the selected circuit RP to enable the selected RP circuit to couple a parallel character to buffer TS and thence to unit UT; e.g., if it is desired to establish a link from station P$_1$ to unit UT, control circuit COD derives a VRP$_1$ signal that enables AND gate 23. (Gates corresponding to gates 21 and 23 for the remaining TP and RP circuits are only illustrated for the circuit TRP$m$ but do not have reference numerals.) Connections to the selected transmitter and receiver circuits TRP and TRA are controlled by signals generated by circuit COD.

Additional signals for controlling parallel to serial readout from interface circuits TRP to stations P and for controlling serial to parallel read in from stations P to circuits TRP are supplied by circuit COD to a selected TRP station under the control of signals VT and VR. The additional control signals are selectively coupled between controller circuit COD and one of circuits TRP through further AND gates enabled by signals VR and VT; for example two AND gates 22 and 24 are respectively enabled by signals VTP1 and VRP1 to transfer control signals from circuit COD to circuits TP1 and RP1 (gates corresponding to gates 22 and 24 for the remaining TP and RP circuits are only illustrated for the circuit TRP$m$ but do not have reference numerals).

Unit UT generates clock signals or pulses (H$o$T) that are transmitted to the receiving and transmitting circuits TRP and TRA transmission to the apparatus receiver/transmitter circuits TRA at the $m$ stations P is made by the $m$ channels C1, C2 . . . C$m$. The H$o$T signals define the frequency at which data, in the form of characters composed of several binary bits, are transmitted by a pair of lines LR and LT; each of the pairs is included in a separate channel C. The H$o$T signals have a frequency corresponding to the serial bit rate of data transmitted over channels C. One interval of clock H$o$C defines the time between adjacent parallel characters being coupled between unit UT and the interface of the invention. The H$o$T signals provide synchronization between the transmitter and the receiver circuits TRP and TRA which are in communcation.

By means of a transmission and reception identifying circuit IRT, which is connected to be responsive to each of the station transmitter and receiver circuits and to supply signals to unit UT via buffer TS, a fresh transfer of information is performed by giving orders to unit UT as a function of the status of the TRP circuit in which or from which the data are to be stored or read.

Signals ERTT and ERTR which validate transfers of data, character by character, between the interface transmitter and receiver circuits TRP and unit UT are derived from and generated as a function of the state of the circuits TRP. The high level of an ERTT signal is derived from circuit TP and transmitted to transmission identifying circuit IT in circuit IRT in response to the particular circuit TP being ready to receive new data from unit UT via circuit TE. The high level of an ERTR signal is derived from a particular RP circuit and transmitted to reception identifying circuit IR in circuit IRT in response to the circuit being ready to transmit information to unit UT via circuit TS. For example, in response to circuits TP1 and RP1 being respectively activated to transmit data to channel C1 and buffer TS, signals ERTT1 and ERTR1 have binary one values. Multi-bit control signals for read out control of circuits IR and IT, are respectively supplied from circuit COD to circuits IR and IT through AND gates 22' and 24'. Read out from circuits IR and IT into buffer TS is via gates 21' and 23' that are selectively enabled by signals VIR and VIT. In response to the output signals of circuits IR and IT, unit UT senses the states of circuits IT and IR to determine the state of the circuits TRp with which it wishes to exchange information; hence, unit UT signals to the circuit that it wants to determine the state of a particular TRP circuit and circuit COD derives enabling signals VIT and VIR and control signals which are transmitted to the IR and IT circuits.

A reception monitoring circuit COR is connected to the $m$ reception lines (LR1, LR2 ... LR$m$) of the $m$ channels by $m$ inputs to the $m$ station receiver circuits by respective ones of $m$ sets of inputs, and to circuit COD by $m$ other inputs as well as by another set of inputs via circuit COD which derives control signals (CCCR). Information transmitted by one of the station receiver circuits to circuit COR is monitored, in response to control signals emitted by circuit COD, each time a series character is received by one of lines (LR1, LR2 ... LR$m$). Circuit COR responds to its input signals to determine if the signals received from lines LR by circuits RP are in error. The results of the monitoring operation by circuit COR are communicated to unit UT through output buffer circuit TS.

Figure 3:
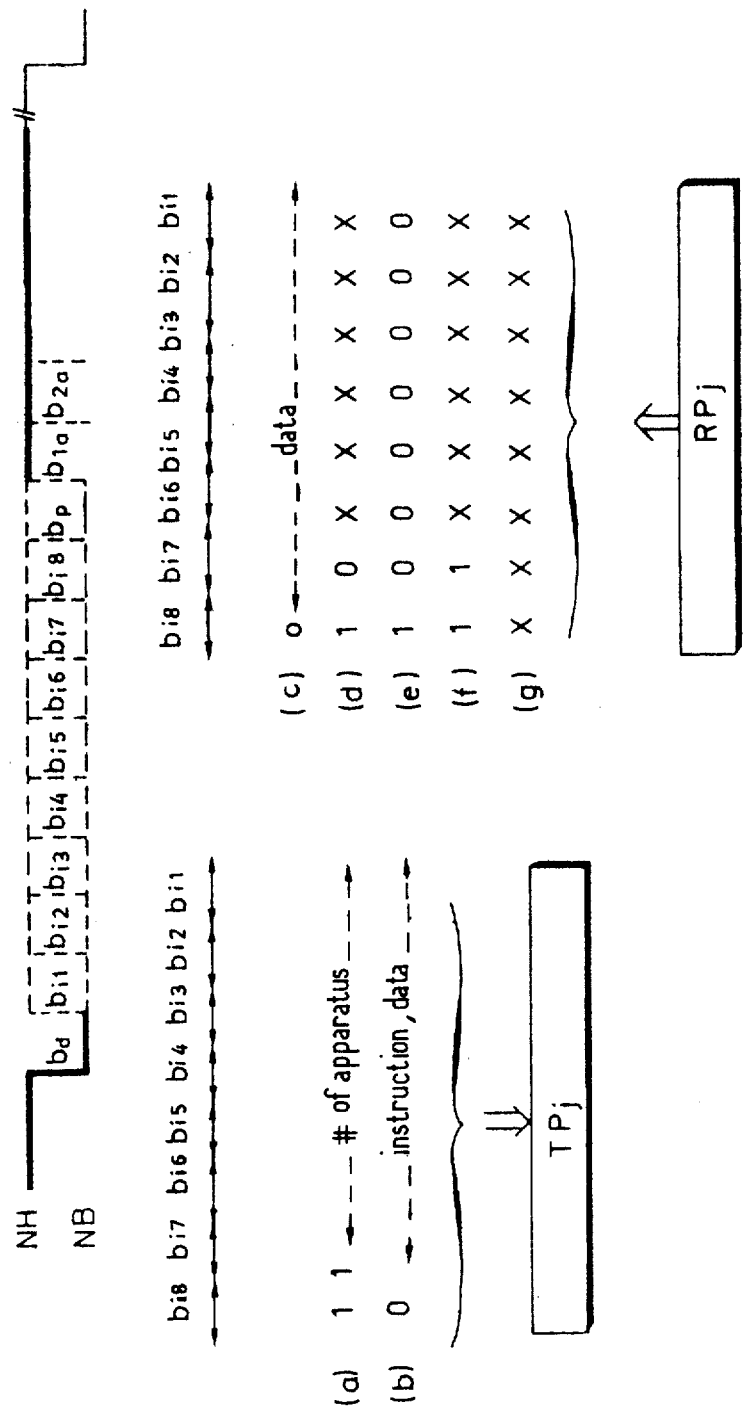
FIG. 3 is an example of a format for characters transmitted by the interface according to the invention and of the invention which each character contains.

An example of the format of the characters which are transmitted by the lines LR and LT in each channel C is given in FIG. 3. Each character contains a first, starting bit bd, eight data bits ($bi$1, $bi$2 ... $bi$8), a parity bit $bp$, and two stop bits $b$1$a$, $b$2$a$. The start bit $bd$ is at a low level NB, preceded by a high level NH. The stop bits $b$1$a$ and $b$2$a$ are at a high level NH which is followed by a high level that separates the particular character from the next character transmitted along the same line. The clock signals H$o$T which are transmitted to the station transmitter and receiver circuits and the apparatus transmitter and receiver circuits have a frequency of transmission and reception of bits of a character, for example, 16 times higher than that at which bits are transmitted along the lines. FIG. 3 shows the information contained in a character in cases $a$), $b$), $c$), $d$), $e$), $f$), $g$), as binary values 1, 0 and either of these two values (represented by X) in the case of the data bits ($bi$1, $bi$2 ... $bi$8). Cases $a$), $b$), relate to two kinds of characters which may be transmitted by a transmitter circuit TP$j$ to a station P$j$. Cases $c$), $d$), $e$), $f$), $g$), relate to five other kinds of character which may be received by a receiver circuit RP$j$ from a station P$j$ selected by signals VTP$j$ and VRP$j$. In case $a$), bit $bi$8=1, bit $bi$7 — 1, and bits $bi$6 to $bi$1 represent the number of the apparatus to be selected to communicate with unit UT; In case $b$), $bi$8=0 and the following bits from $bi$7 to $bi$1 represent the commands or data to be transmitted to the apparatus which has been selected by the preceding case $a$), character, i.e., by its number which has previously been transmitted along the LT$j$ line. In case $c$), $bi$8=0 and the following bits from $bi$7 to $bi$1 represent the data which are received from an apparatus which has been selected by having its number transmitted previously by circuit TP$j$. Case $d$), in which $bi$8=1 $bi$7=0 and bits $bi$6 to $bi$1 may be of any value whatever, represents the case in which there has occurred an error which is not a transfer error on one of the lines LT$j$ or LR$j$. Case $e$), where $bi$8 = 1, $bi$7 = 0, and each of $bi$6 through $bi$1 is a binary 0, represents the case where one of the items of apparatus; a keyboard for example, requests an interruption to the program by which unit UT is communicating with any apparatus at station P$k$. Case $f$), in which $bi$8 = 1 and the other bits $bi$6 to $bi$1 are of any value whatever, represents the case where an error has occurred during the transfer of data from the unit UT to an apparatus. Case $g$), in which $bi$8, $bi$7, and $a$11 the succeeding bits are of any value whatever, represents the case where an error has occurred during the transfer of data from an apparatus to the unit UT.

Figure 4:
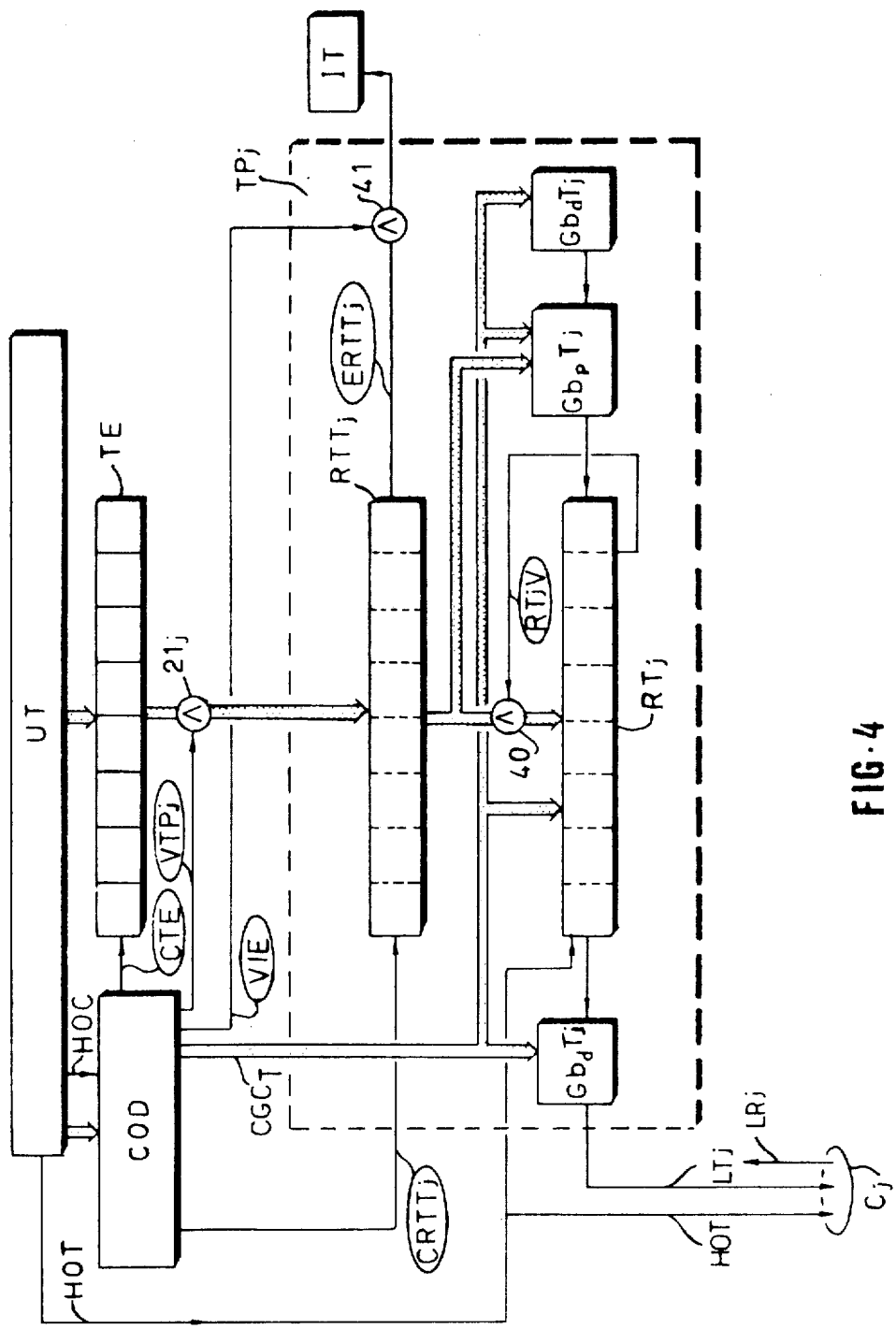
FIG. 4 is a diagram of a station transmitter circuit for the interface according to the invention.

Transmitter circuit TP$j$, FIG. 4, for station P$j$, contains a parallel access buffer register RTT$j$ in which data bits $bi$1, $bi$2 ... $bi$8, FIG. 3 are stored after having passed through an AND gate 21$j$ corresponding to gate 21 connected with circuit TP1. The data stored in register RTT$j$ is derived from unit UT and supplied to the register via input buffer circuit TE, having a number of parallel stages equal to the number of data bits (in FIG. 4 buffer TE is a register having eight storage locations); the data bits stored in register RTT$j$ are awaiting transmission along line LT$j$. The low level of a signal (CRTT$j$) fed by circuit COD to an enable input of register RTT$j$ causes the data passed through the AND gate 21$j$ to be fed into buffer register RTT$j$. Circuit TP$j$ also includes a parallel to series converter or register RT$j$ to which the outputs of register RTT$j$ are applied in parallel. In response to signal (CRTT$j$) going to a high level, the 8 bit character in register RTT$j$ is fed into register RT$j$ via AND gate 40 which is enabled by a signal (RT$j$V) being generated by register RT$j$ to indicate that the register is empty of data, that is to say that nothing is being transmitted along line LT$j$.

Each character transmitted by line LT$j$ has the sequential format shown in FIG. 3. The sequential bits are generated by cascaded circuit including start-bit generator G$bd$T$j$, the register RT$j$ (which contains the data transmitted by register RTT$j$), a parity bit generator G$bp$T$j$ and a stop-bit generator G$ba$T$j$.

Each time a set of data is transferred from register RTT$j$ to register RT$j$; register RTT$j$ generates a signal (ERRT$j$), the high level of which indicates that the register RTT$j$ is ready to receive a new 8-bit data character from unit UT. The state of register RTT$j$ is transmitted to the transmission indicating circuit IT in response to signal (VIE) derived from circuit COD data are transferred from register RTT$j$ to register RT$j$ while VIE has a high state to enable AND gate 41. Circuit COD derives two control signals (CGC$_T$) to cause bits $bd$, $bp$, $b$1$a$, $b$2$a$ to be generated respectively by the three generators G$b_d$T, G$b_p$T and G$ba$T interconnected with register RTj in the same order that generated bits according to the format of character shown in FIG. 3.

The clock pulses (HoT), FIG. 2, are transmitted to register RTj and to station Pj via channel Cj. During the first clock pulse (HoT), bit bi1 is transferred or shifted into generator GbdTj; in response to bit bi1 being shifted into generator GbdT$_j$, the generator transmits to line LTj the start bit bd which was previously generated therein. All the other bits forming the character are shifted one place towards the left in register RTj and generators GbpTj and GbaTj. All the bits in a character are thus transmitted in succession along line LTj in the course of a transmission sequence, until stop bit b2a has been transferred from register RTj to generator GbdTj during a last clock pulse (HoT); immediately after bit b2a has been transferred to generator GbdTj, it is transmitted along line LTj. Generator GbdTj continues to derive a high level (the same level as bit B2A) until the next character is fed into converter RTj, i.e., until the start bit bd of the next character is derived from generator GbdTj under the control of the CGCT. pulse at the beginning of the next character.

Figure 5:
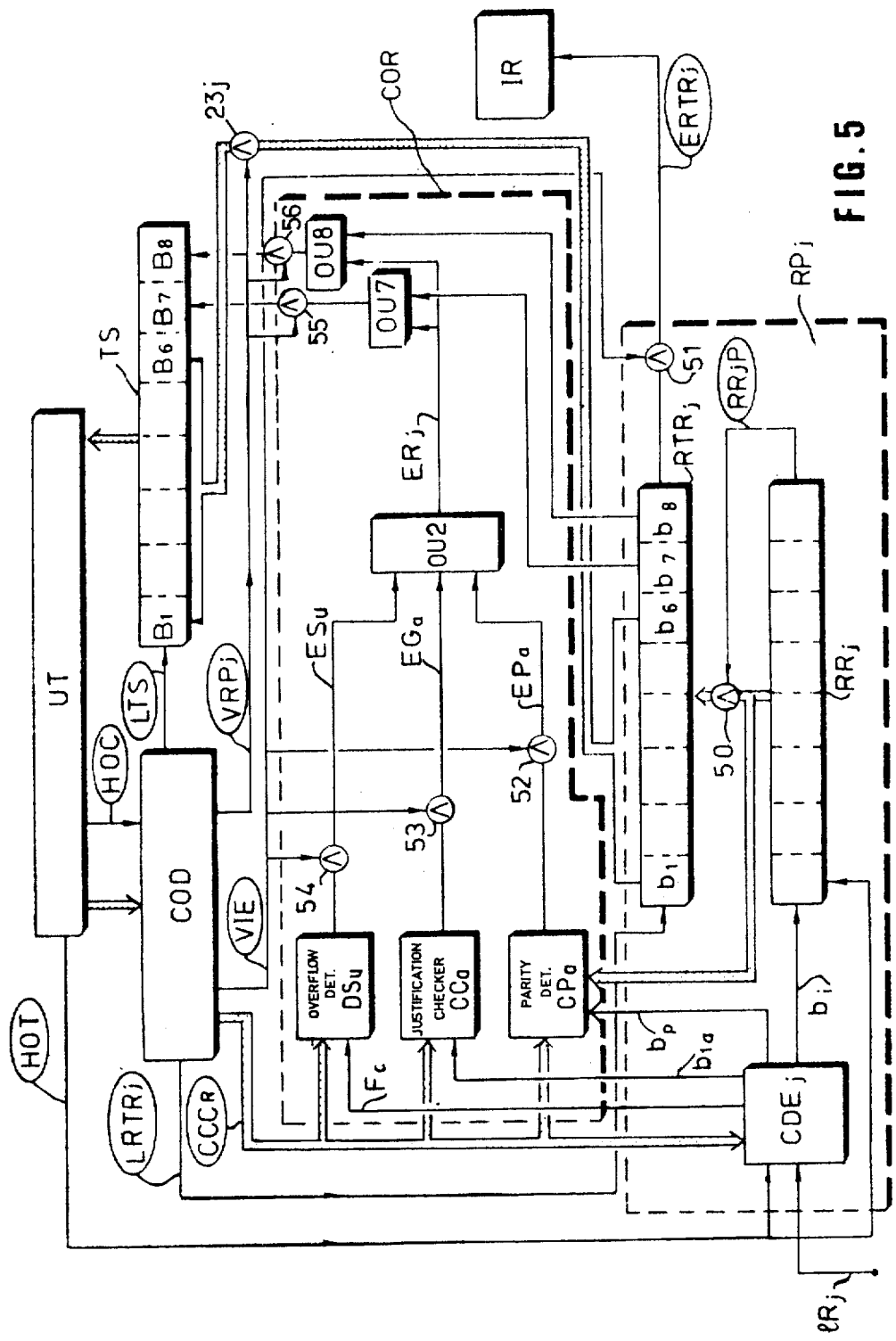
FIG. 5 is a diagram of a station receiver circuit and monitoring circuit for the interface according to the invention.

In FIG. 5, a station receiver circuit RPj of the interface according to the invention is illustrated as containing a serial to parallel converter or register RRj which has a series input from line LRj of channel Cj and parallel outputs. After a series character has been loaded into converter RRj, the eight data bits (bi1, bi2 ... bi8) in the character are supplied by the parallel outputs of the converter to parallel inputs of a buffer register RTRj where they are stored while waiting to be read by unit UT, which is connected to buffer RTRj via AND gate 23j and output buffer circuit TS; each of registers RRj, and RTRj and TS has a number of stages equal to the number of data bits in a character so that in the system of FIG. 5 each of these registers has 8 storage locations. When register RRj is full, that is to say when it contains the 8-bit data (bi1, bi2 ... bi8) making up a series character received from line LRj, it emits a signal (RRjP) which enables AND gates 50 to allows the data bits to be transferred to register RTRj. Circuit COD derives a signal (LRTRj) that enables buffer register TS to read from register RTRj. When register RTRj has been emptied of its content, the high level of a signal (ERTRj) is transmitted to the reception identifying circuit IR of FIG. 2 through an AND gate 51 which is at this time enabled by signal (VIE) of FIG. 4, that is derived from circuit COD.

To separate the start, stop and parity bits from the data bits in each series character coupled to circuit RPj so that only the data bits are supplied to converter RRj, circuit RPj includes a character detection circuit CDEj having one input responsive to the eight sequential character forming bits on line LRj; the bits are coupled to circuit CDEj at a frequency controlled by the clock signals (HoT) coupled to circuit CDEj from unit UT. To control circuit CDEj so that only the data bits are supplied to converter RRj and other bits in the received series character are routed to monitoring circuit COR for error checking purposes, control signals (CCCR) are generated by circuit COD in response to the program being run by unit UT. This is to be expected since the format of the character (such as that shown in FIG. 3) is determined by the program being carried out by unit UT. The start bit, bd, of a character received from line LRj is detected by circuit CDEj and the following eight bits, i.e., data bits bi1 to bi8, are transmitted by circuit CDEj to the series input of register RRj for storage there (before being transferred to register RTRj) at a loading frequency which is determined by the clock signals (HoT).

Monitoring circuit COR includes a first monitoring circuit CPa for checking the parity (or lack of parity) of the 8 data-bits received in a character by receiver circuit RPj. To this end, the parity bit coupled by line LRj is detected by circuit CDEj and thence routed to circuit CPa under the control of signals CCCR. Circuit CPa comprises a parity generator responsive to the parallel outputs of register RRj to calculate the parity of the data bits bi1 to bi8 which are received from line LRj. The parity calculated by the parity generator is combined with the detected parity supplied by detector CDEj in a comparator which derives an error signal Epa in response to the calculated parity being different from bit bp.

Circuit COR contains two other circuits CCa and DSu for checking justification and detecting overloading in response to selective bits of a serial input character. To this end, the first data bit bi1 and the stop bits are coupled from detector CDEj to circuits DSu and CCa under the control of signals (CCCR). For the format of FIG. 3, the first stop bit b1a must be at a high level, otherwise the character is mis-justified. Circuit CCa determines whether bit b1a is at the required high level; if bit b1a is not at the high level circuit CCa derives a justification error signal ECa. Overflow detecting circuit DSu determines whether and end-of-character received by an input from the detection circuit CDEj reception signal Fc, is approximately in time coincidence with the derivation from register RRj of the signal (RRjP) when the content of register RRj is feed into register RTRj. If circuit DSu receives signal Fc before circuit COD has indicated to it by means of signals (CCCR) that the previous character has been read out from register RTRj, circuit DSu derives an overflow error signal ESu.

Circuit COR includes an OR gate OU2, selectively responsive to the outputs of circuits CPa, CCa, and DSu, as respectively coupled through AND gates 52, 53 and 54, all of which are enabled by output signal (VIE) of circuit COD. If at least one of the three error signals EPa, ECa, ESu is present at the input to OR gate OU2, the OR gate derives an error signal ERj. Six-bit data consisting of bits bi1 to bi6 are respectively transferred from locations b1 to b6 of register RTRj to locations B1 to B6 of register TS in response to an enabling signal (VRPj) being derived from circuit COD. As shown in FIG. 3, the binary value of data bits bi7 and bi8 is significant of the state of the character. By means of OR gates OU7 and OU8 in circuit COR the two bits bi7 and bi8 are transferred from locations b7 and b8 of register RTRj to locations B7 and B8 of register TS by signal VRPj enabling AND gates 55 and 56 which are respectively connected to the outputs of OR gate OU7 and OR gate OU8. In response to an error signal ERj being derived from gate OU2, bits bi7 and bi8 are made to assume the value 1 to indicate to unit UT that the character being transferred to it is erroneous. To this end the ERj signal is applied in parallel to OR gates OU7 and OU8, and thence to stages B7 and B8 of buffer register TS. When locations B1 to B8 or register TS have been loaded, the 8 data bits in register TS are transferred to unit UT in response to an enabling signal (LTS) being coupled to the register from circuit COD.

Figure 6:
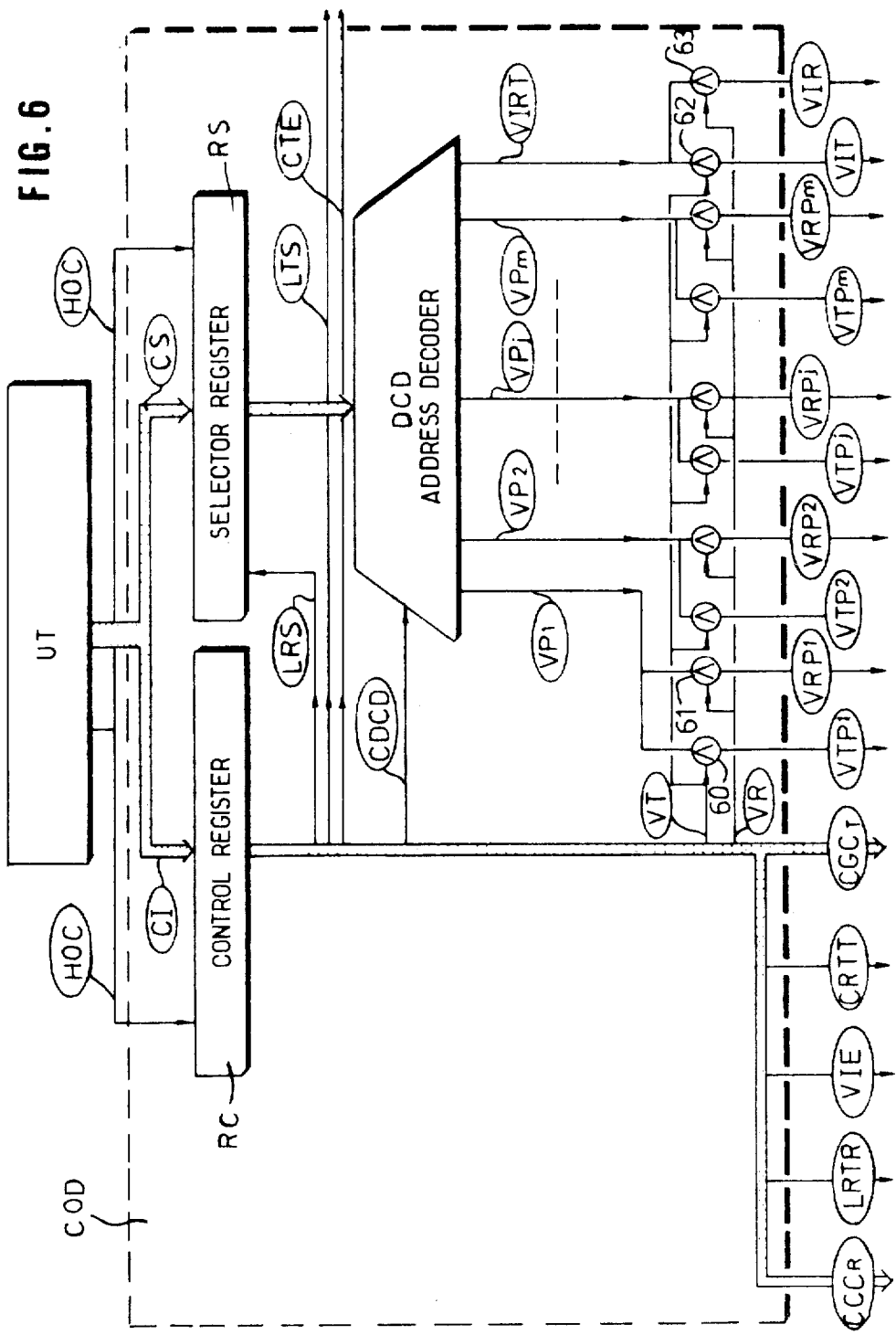
FIG. 6 is a diagram of a control circuit for the interface according to the invention.

The control circuit COD illustrated in FIG. 2, 4 and 5 contains in FIG. 6 a control register RC into which are successively fed the interface command signals (CI) which are transmitted by the unit UT when it is running the program that controls the communications with at least one of the $m$ stations via the interface of the present invention. Clock signals (HoC) derived from unit UT cause register RC and a register RS of circuit COD to be loaded respectively with the signals CI and signals CS which are the coded number of each circuit to be selected by circuit COD. The coded number of any circuit to be selected is transferred from register RS to a decoder DCD by means of read-enabling signal LRS being coupled from register RC to register RS. A control signal (CDCD) transmitted from the output of register RC to decoder DCD allows the circuit number supplied to decoder DCD to be decoded as being that of one of the station receiver and transmitter circuits (TRP1, TRP2, . . . TRP$m$) of FIG. 1 or the reception and transmission identifying circuit IRT of FIG. 2.

Decoder DCD has at least ($m$+1) outputs (VP1, VP2, . . . VP$m$, VIRT) only one of which may be energized at any particular time to select any one of the ($m$+1) TRP and IRT circuits. The ($m$+1) outputs (VP1 . . . VP$m$, VIRT) of decoder DCD are connected to respective ones of two sets of AND gates respectively enabled by a transmission enable signal (VT) and a receive enable signal (VR) transmitted by register RC when the unit has to exchange information with station transmitter/receiver circuits via registers TE and TS. Thus, when station number P1 is decoded by decoder DCD and the transmission enable signal (VT) is derived from register RC, a signal (VP1) is transmitted from the first output of the decoder through the first AND gate 60 to produce the signal (VTP1) of FIG. 2. In response to the number of monitoring circuit IRT being decoded by decoder DCD and the transmit enable signal VT being derived, a signal (VIRT) is derived from the ($m$+1)$^{th}$ output of the decoder and coupled through enabled AND gate 62 as signal (VIT) (FIG. 2). Similarly, if station number P1 is decoded by decoder DCD while a receive enable signal VR is being derived, signal (VP1) is transmitted from the first output of the decoder to generate signal (VRP1) (FIG. 2) at the output of the first AND gate 61. The number of monitoring circuit IRT being by decoder DCD, a signal VIRT is generated at a ($m$+1)$^{th}$ output of the decoder and two decoded signals VIT and VIR (FIG. 2) are generated respectively from the output of two ($m$+1)$^{th}$ AND gates 62 and 63 enabled by signals VT and VR.

The control signals CI are sets of bits successively generated by unit UT and loaded, by inputs in parallel of register RC, in the set of flip-flop of which is composed the register enabled by successive clock signals HoC. Each set of bits loaded in register RC is then transmitted, during an interval of time between two adjacent clock pulses HoC, by at least one signal generated at one of the outputs in parallel of register RC. Thus, by seven successive sets of bits sent by unit UT, the signals CCC$_R$, LRTR, VIE, CRTT, CGC$_T$, LTS, CTE, are successively generated at different outputs of register RC. Said outputs are respectively connected with circuit COR of FIGS. 2 and 5, register RTR in circuit RP of FIG. 5, AND gate 41 in circuit TP on FIG. 4, register RTT in circuit T$_P$ of FIG. 4, generator Gb$_a$T in circuit TP of FIG. 4, register TS of FIGS. 2 and 5, and register TE of FIGS. 2 and 4. The four other signals LRS, CDCD, VT and VR of FIG. 6 are also generated at four other outputs of register RC respectively connected with register RS, decoder DCD and the two sets of AND gates such as gates 61 and 60.

Figure 7:
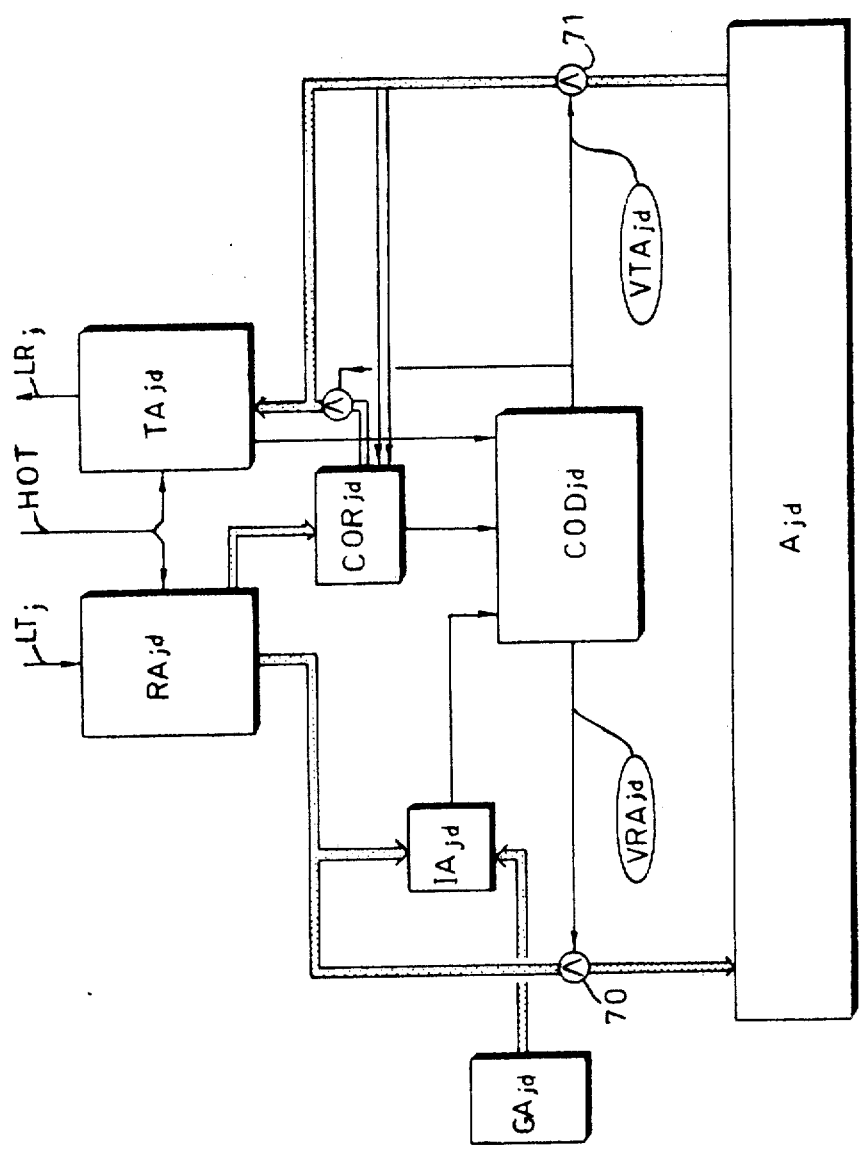
FIG. 7 is a diagram of a apparatus transmitter/receiver circuit associated with each item of apparatus.

In FIG. 7 there is illustrated an embodiment of the apparatus transmitter/receiver circuit TRA$jd$ associated with an apparatus A$jd$ at station P$j$. Circuit TRA$jd$ contains a receiver circuit RA$jd$ to convert a received series-character from line LT$j$ into a parallel-character which is coupled to apparatus A$jd$ while AND gate 70 is enabled by signal VRA$jd$ that is selectively derived from control circuit COD$jd$. Circuit TRA$jd$ includes a transmitter circuit TA$jd$ for converting a parallel input character derived from apparatus A$jd$ into a series-character which is transmitted along line LR$j$ by one output. The parallel input to circuit TA$jd$ is through AND gate 71 while the AND gate is enabled by a VTA$jd$ output signal of control circuit COD$jd$. Circuits RA$jd$ and TA$jd$ are of a similar design to the station receiver and transmitter circuits shown in FIGS. 4 and 5.

Clock signals (HoT) are transmitted along channel C$j$ to circuits RA$jd$ and TA$jd$ to synchronize their operation with that of the receiver and transmitter circuits of station P$j$ with which they respectively exchange information. The first character transmitted along line LT$j$ by the transmitter circuit TP$j$ contains the number of the apparatus to be selected. This first character, having been converter by circuit RA$jd$ into a parallel character, is transmitted to an apparatus identifying circuit IA$jd$ which compares the apparatus number received with the apparatus number A$jd$ which is generated by a generator GA$jd$. If the two numbers are the same, circuit IA$jd$ generates a signal to enable control circuit COD$jd$ which controls circuit TRA$jd$. A monitoring circuit COR$jd$ responsive to parallel output bits of circuit RA$jd$ monitors each received character to derive a character indicating error signal that is supplied to control circuit COD$jd$.

After a complete character has been transmitted by circuit TA$jd$ to line LR$j$, circuit TA$jd$ derives a signal that causes circuit COD$jd$ to generate the signal VTA$jd$ for enabling AND gate 71 to transfer a fresh character from apparatus A$jd$ to transmitter circuit TA$jd$. In the event of an error being detected by circuit COR$jd$ when a character is being received by circuit RA$jd$, circuit COD$jd$ supplied a disable signal to the transfer of a character to apparatus A$jd$. Detection of an error in the signal received by circuit RA$jd$ also causes circuit COR$jd$ to change bits $bi7$ and $bi8$ of the character to be transmitted along line LR$j$ in accordance with the state code shown in FIG. 3; so an abnormal state resulting from an error being detected by circuit COR$jd$ is indicated to unit UT by the changed bits $bi7$ and $bi8$ of the character transmitted by line LR$j$.

To initiate a message from unit UT through the connecting interface which is the subject of the present invention, when requested by an operator the unit UT derives a sequence of apparatus call-ups by transmitting along the channel C for the selected station P characters having codes that follow a binary progression, for example. If the apparatus requested is not at the selected station, unit UT requests the next apparatus in the sequence by the call-up, since no signal is supplied to the unit by buffer TS within a predetermined interval after the signal for the particular apparatus was derived from unit UT; to this end UT includes a programmed timer. After making a complete round, the data-processing unit UT knows, the configuration of the station, that is to say the numbers of the items of apparatus situated at the station. For example, by allotting different numbers from 0 to 63 to the items of apparatus at a given station (these numbers being represented by the different combinations of the six address bits $bi1$ to $bi6$ in FIG. 3), a large number of items of apparatus may be installed and addressed at a station without it being necessary to take into consideration their nature, that is type and sub-type of the apparatus item, as is necessary with star connections.

With an interface of the type described, it is possible to interrupt the execution of a running program by which unit UT is communicating with one of the items of apparatus in the stations connected to it. An item of apparatus, such as a keyboard may transmit a character, as in case $e$) (FIG. 3) which, when transmitted to unit UT, causes the running program to be interrupted. In general terms, there is an interruption of the program of unit UT when: bit $bi8$ received by a station receiver circuit RP has a value of one in the event of a malfunction being detected by circuit TRA at a station P or when bit $bi8=1$, in response to an error being detected by circuit COR at the interface as occurs when an erroneous character is received by the interface on line LR$j$. As a result of this interruption, an instruction to restart the interrupted program allows unit UT to identify the number of the station responsible for the interruption. Thereby, a diagnosis may take place in the event of a fault, or a message may be initiated with the keyboard, for example which has data to exchange with the unit.

A modification to the interface according to the invention involves connecting data-processing unit UT to at least one apparatus in a working station through two channels, one of which is connected to another apparatus transmitter/receiver circuit. Thereby, said apparatus can communicate with unit UT through two stations since two channels can connect it to the unit and simultaneous communications between the apparatus and unit UT can be along two channels by selecting the two stations in parallel.

The invention described is particularly beneficial when applied to so-called slow items of apparatus, that is, to apparatus which is able to transmit or receive data only at a rate slower than that at which unit UT can transmit or receive data. In effect, the series-transmission of each character does not represent a drawback from a performance point of view. Also, because unit UT is only able to communicate with a single apparatus in the same working station at any one time, the sequential connections between unit UT and the items of apparatus at a station does not represent a drawback.

The invention also has the advantage that it can be employed if data-processing unit UT is a microprocessor having a cycle time of approximately 2 microseconds, in which case the unit is easily able to manage eight working stations. In a preferred embodiment of the invention, transmission along each channel takes place at a rate of the order of 10,000 bauds.

While there has been decribed and illustrated one specific embodiment of the invention, it will be clear that variations in the details of the embodiment specifically illustrated and described may be made without departing from the true spirit and scope of the invention as defined in the appended claims.

I claim:

1. An interface for connecting a data-processing unit to a group of $m$ working stations formed by items of data emitting and receiving apparatus, the unit and each of the items of apparatus transmitting and receiving binary data in parallel characters in response to control signals which are generated in the unit, said characters being transmitted and received in series, comprising $m$ transmitter/receiver circuits associated with the $m$ stations and a transmitter/receiver circuit associated with each item of apparatus, each transmitter/receiver circuit including means for:

a. converting a parallel, input character supplied to it into a sequence of bits forming a series output character, and b. converting sequential input bits forming a series-character into a parallel output character, means for selectively supplying a parallel output character from the unit as a parallel input character to each of the station transmitter/receiver circuits, means for selectively supplying a parallel output character at each station transmitter/receiver circuit associated with a particular station as a parallel input character to the unit, each transmitter/receiver circuit including two terminals adapted to be connected to first and second transmission lines forming a channel associated with each station, one of said terminals coupling a series output character from the transmitter/receiver circuit to the first transmission line, the other terminal coupling a series input character from the second transmission line to the transmitter/receiver circuit, means for supplying a parallel output character of each apparatus transmitter/receiver circuit associated with a particular item of apparatus as a parallel input character to the item of apparatus associated with the apparatus transmitter/receiver circuit, means for supplying a parallel output character of the particular item of apparatus associated with each apparatus transmitter/receiver circuit as a parallel input character to the apparatus transmitter/receiver circuit associated with the particular item of apparatus, said first and second transmission lines respectively coupling a series output character terminal from the circuit associated with a particular station to a series input character terminal of each apparatus transmitter/receiver circuit at that station and a series output character terminal of each apparatus transmitter/receiver circuit at a station to a series input character terminal of the circuit associated with that staton.

2. The connecting interface of claim 1, further including an interface control circuit having inputs connected to the unit, said control circuit including station selecting means comprising a decoder having inputs connected to the unit to decode address characters derived from the unit and at least $m$ outputs for deriving $m$ station enabling signals by decoding $m$ address characters successively at the inputs of the decoder.

3. The connecting interface of claim 2 further including a first and a second sets of $m$ transfer circuits respectively connected to the parallel inputs and outputs of the $m$ transmitter/receiver circuits the two transfer circuits connected to each transmitter/receiver circuit being connected to one output of the decoder to be enabled by the enabling signal of the associated station.

4. The connecting interface of claim 3 further including an input buffer circuit and an output buffer circuit, the input buffer circuit having parallel input terminals responsive to the parallel output data signals of the unit and parallel output terminals coupled in parallel to the first set of $m$ transfer circuits, the output buffer circuit including parallel input terminals coupled in parallel to the second set of $m$ transfer circuits and output terminals for supplying parallel input data signals to the unit.

5. The connecting interface of claim 3 wherein the control circuit further includes means for separately controlling the $m$ station transmitter/receiver circuits, said means for separately controlling including at least one control register having parallel input terminals connected to be responsive to output control signals of the unit and having parallel output terminals connected respectively to the $m$ station transmitter/receiver circuits.

6. The connecting interface of claim 5 further including a third and a fourth sets of $m$ transfer circuits by means of which the output terminals of the said control register are connected to the $m$ station transmitter/receiver circuits, the two transfer circuits of the third and fourth sets connected to each station transmitter/receiver circuit being further connected to one output of the decoder to be enabled by the enabling signal of the associated station.

7. The connecting interface of claim 1 wherein apparatus address indicating characters derived from the unit have different patterns associated with different items of apparatus at a station and the serial output characters derived from each station transmitter/receiver circuit including a first apparatus address character derived from the unit, further including apparatus selecting means responsive to a first serial input character transmitted by the first transmission line and the receiver circuits associated with the items of apparatus at a station, the apparatus selecting means including means for respectively identifying the addresses of the apparatus indicated by the apparatus address indicating characters, each identification circuit connected to the receiver circuit associated with an item of apparatus including a comparator for deriving an apparatus enabling signal in response to the identified apparatus-address indicating character being the same as the address character of the item of apparatus in question.

8. The connecting interface of claim 7 further including an apparatus controlling circuit connected to the transmitter and receiver circuits of each item of apparatus at a station and to the comparator in the identification circuit of the item of apparatus in question to be enabled by enabling signal derived from the comparator.

9. The connecting interface of claim 8 further including two transfer circuits for respectively coupling the outputs and the parallel-character inputs of the receiver and transmitter circuits of each item of apparatus to inputs and outputs of said item of apparatus.

10. The connecting interface of claim 2 further including a monitoring circuit responsive to an enabling signal derived from the interface control circuit, said monitoring circuit including separate inputs responsive to output signals of the $m$ station transmitter/receiver circuits and outputs coupled to the unit and to the second lines supplying serial characters to the $m$ station receiver circuits, the monitoring circuit thereby monitoring each character received from a station by the station receiver circuit with which it is associated.

11. The connecting interface of claim 1 further including a circuit for identifying signals received and transmitted along the lines connected to the $m$ stations, said identification circuit having inputs responsive to the $m$ station transmitter/receiver circuits and an output for supplying to the unit an indication each time the transmission or reception of a series-character by one of the $m$ station transmitter/receiver circuits is completed.

12. The connecting interface of claim 10 wherein each character transmitted by the lines in each channel has a format defined by a start bit, a given number of data bits, a parity key bit applicable to the data bits, and a least one stop bit, the start and stop bits having binary values respectively determined by the value of the bit preceding the start bit and the value of the bit following the stop bit, said monitoring circuit including a circuit for detecting the bits in each character to be monitored received from the $m$ stations said detection circuit including means for respectively detecting the start bit, the data bits, the parity and the stop bit of each character received by control signals derived from the interface control circuit.

13. The connecting interface of claim 12, wherein said monitoring circuit further includes a parity checker connected to be responsive to the character-parity-bit detector and to the data bits derived from $m$ station transmitter/receiver circuits, said monitoring circuit including means for calculating a parity-key bit in response to the data bits derived fom the station transmitter/receiver circuits and for generating a parity error signal in response to the calculated parity-bit different from the parity-key bit derived by the parity bit detector.

14. The connecting interface of claim 12 wherein said monitoring circuit further includes a character justification checker connected to be responsive to the stop bit detector, the monitoring circuit including means for generating a justification error signal in response to the binary value of the stop bit transmitted by the said detector being abnormal.

15. The connecting interface of claim 12, wherein the monitoring circuit further includes a detector for detecting over-loading between a character received from one of the $m$ stations and a preceding character received from the same station, said overloading detector being connected to be responsive to the stop bit detector and to an output of the $m$ station transmitter/receiver circuits, the overload detector including means for generating an overload error signal in response to the stop bit transmitted by the bit detector being received by one of the $m$ transmitter/receiver circuits before said one transmitter/receiver circuit has finished transmitting the previous character to the unit.

16. The connecting interface of claim 12 wherein said monitoring circuit further includes an OR gate having three inputs respectively connected to be responsive to output error signals of the parity and justification checkers and the overload detector, said OR gate deriving an error signal in response to at least one of the three error signals being derived.

17. The connecting interface of claim 16 wherein each character data coupled from one of the $m$ transmitter/receiver circuits to the unit includes at least one state bit for the transmitted character, said state bit having a predetermined binary value in response to an error signal being derived, said monitoring circuit further including at least one OR gate connected to be responsive to the error signal and to a data bit derived from the $m$ transmitter/receiver circuits, said at least one OR gate having an output coupled to the unit so that the OR gate supplies the unit a state bit having the predetermined binary value in response to an error being detected by the monitoring circuit when a character is received by one of *m* transmitter/receiver circuits and in response to an error being indicated by the presence of a stop bit having the predetermined binary value in the said received character.

18. The connecting interface of claim 1, wherein at least one item of apparatus belong to a first station and is connected to a first channel associated with this first station by a first apparatus transmitter/receiver circuit, further including a second apparatus transmitter/receiver circuit associated with said item of apparatus and connected to a second channel associated with a second station so that data received and derived from said item of apparatus is respectively derived from and received by the unit via the first apparatus transmitter/receiver circuit and the first channel and via the second apparatus transmitter/receiver circuit and the second channel.

19. An interface for connecting a data-processing unit to a group of *m* working stations formed by items of data emitting and receiving apparatus, the unit transmitting and receiving binary data in parallel characters in response to control signals which are generated in the unit, said characters being transmitted and received in series comprising *m* transmitter/receiver circuits, one of which is associated with each of the *m* stations, each transmitter/receiver circuit including means for: (a) converting a parallel, input character supplied to it into a sequence of bits forming a series output character, and (b) converting sequential input bits forming a series-character into a parallel output character; means for selectively supplying a parallel output character from the unit as a parallel input character to each of the station transmitter/receiver circuits, means for selectively supplying a parallel output character of each station transmitter/receiver circuit associated with a particular station as a parallel input character to the unit, each transmitter/receiver circuit including first and second terminals adapted to be connected to first and second transmission lines forming a channel associated with each station, said first terminal coupling a series output character from the circuit associated with the particular station to the first transmission line, said second terminal coupling a series output character from the second transmission line to the means for converting sequential input bits in the circuit associated with the particular station, an interface control circuit including at least a register having inputs responsive to sequential control signals derived from the unit, two of said control signals enabling the *m* station transmitter/receiver circuits to be connected to the unit, said control circuit further including a station selecting means comprising a decoder having inputs responsive to the station indicating signals derived from the unit and *m* outputs, a separate one of said *m* outputs being provided for each of the stations, the decoder including means for deriving an enabling signal at respective ones of its *m* outputs in response to the station indicating signals derived from the unit and, two sets of *m* transfer circuits respectively enabled by the two control signals for transferring each enabling signal at an output of the decoder by two of said transfer circuits, so that each station transmitter/receiver circuit is selectively connected to the unit by an enabling signal transferred for transmitting to the unit and receiving from it parallel characters sequentially.

* * * * *